United States Patent
Nozaki

(10) Patent No.: US 7,586,337 B2
(45) Date of Patent: Sep. 8, 2009

(54) CIRCUIT FOR SWITCHING BETWEEN TWO CLOCK SIGNALS INDEPENDENTLY OF THE FREQUENCY OF THE CLOCK SIGNALS

(75) Inventor: Yasuhiro Nozaki, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 0 days.

(21) Appl. No.: 11/834,737

(22) Filed: Aug. 7, 2007

(65) Prior Publication Data

US 2008/0054952 A1    Mar. 6, 2008

(30) Foreign Application Priority Data

Aug. 30, 2006 (JP) ............................. 2006-234300

(51) Int. Cl.
  *G06F 1/08* (2006.01)
  *H03K 17/00* (2006.01)
(52) U.S. Cl. ......................... 327/99; 327/298
(58) Field of Classification Search ................... 327/99, 327/298
See application file for complete search history.

(56) References Cited

U.S. PATENT DOCUMENTS

2005/0225361 A1* 10/2005 Rhee ............................ 327/99

FOREIGN PATENT DOCUMENTS

JP    11-242529    9/1999

* cited by examiner

*Primary Examiner*—Lincoln Donovan
*Assistant Examiner*—Daniel Rojas
(74) *Attorney, Agent, or Firm*—Volentine & Whitt, P.L.L.C.

(57) ABSTRACT

A clock switching circuit for switching between plural clock signals includes a selector for outputting a first control signal when a low speed clock is selected by a selection signal with a permission signal halted, and a second control signal when a high speed clock is selected by the selection signal with a second permission signal halted. The switching circuit includes a first stabilizer for holding the first control signal in timed with the low speed clock to output the second permission signal, and a second stabilizer for holding the second control signal in timed with the high speed clock to output the first permission signal. The switching circuit includes a first and a second gating cell circuit for latching and outputting the low speed clock and the high speed clock when the second permission signal and the first permission signal is supplied, respectively.

6 Claims, 4 Drawing Sheets

CIRCUIT FOR SWITCHING BETWEEN TWO CLOCK SIGNALS INDEPENDENTLY OF THE FREQUENCY OF THE CLOCK SIGNALS

BACKGROUND OF THE INVENTION

1. Field of the Invention

The present invention relates to a clock switching circuit for switching between two sorts of clock signals.

2. Description of the Background Art

The Japanese patent laid-open publication No. 242529/1999 discloses an example of the conventional clock controller. FIG. 2 of this publication shows the clock controller aiming to switch between two clocks received on the respective two clock input terminals in response to an asynchronous clock switching signal supplied on a clock selection terminal, within a short time, such as not to cause a hazard.

FIG. 4 shows a clock controller which is also disclosed in the above Japanese publication, and includes a selector 4 for switching between the two input clocks #0 and #1, and a first selector controller 5 for controlling the selector 4. The clock controller also includes a first delay circuit 6 for delaying the clock switching signal and for routing the delayed signal to the first selector controller 5, and a signal holding circuit 7 for holding the clock selected by the selector 4 in response to the clock switching signal. The clock controller further includes another selector 8 for switching between the signal output from the signal holding circuit 7 and the signal output from the selector 4, and a second selector controller 9 for controlling the other selector 8. It also includes a second delay circuit 10 for delaying the clock switching signal and for routing the delayed signal to the second selector controller 9, and a counter 11 for generating a signal synchronized with the clock output from the selector 4 to route the so generated signal to the second selector controller 9. Further, it includes a noise removing circuit 12 for removing the noise involved in the output signal of the selector 8 to output the resulting noise-free signal on its output terminal 13.

In this conventional clock controller, there is fear that, if the clock switching signal is switched from its binary value "1" to "0" just before the clock #0 is switched from "1" to "0", the first selector 4 changes its output to "0" at the instant the second selector 8 is switched, thus causing a whisker-like signal of a short pulse duration approximately corresponding to the period of a delay caused by the first delay circuit 6, that is, a hazard. However, the hazard caused at this time is of an extremely short duration and hence may be removed by the noise removing circuit 12. The clock switching signal is then supplied via the first delay circuit 6 to the first selector controller 5, thus rendering the output of the first selector 4 switched from the clock #0 to the clock #1, while the second selector 8 has selected the output of the signal holding circuit 7 and thence holds the signal of binary value "1".

When the output of the first selector 4 is switched from the clock #0 to the clock #1, the counter 11 generates, after several clocks, a signal synchronized with the clock #1. Responsive to the synchronous signal thus output from the counter 11, a selector switching signal causes the second selector 8 to select, instead of the output of the signal holding circuit 7, the clock #1 output from the selector 4. Since the selector switching signal, received by the selector 8, is synchronized with the clock #1, no hazard is caused by the switching.

However, in the above-stated clock controller, the clock switching signal is delayed by the first and second delay circuits 6 and 10 in order to switch between the two clocks #0 and #1. It is therefore necessary to design the amount of delay with the relationship with respect to the frequencies of the clocks #0 and #1 taken into account. This necessitates complicated designing work in determining the amount of delay. In addition, the amount of delay is to be changed adaptively to changing the frequencies of the clocks #0 and #1.

SUMMARY OF THE INVENTION

It is an object of the present invention to provide a clock switching circuit for switching the clock signals without causing hazards independently of the frequencies of the clock signals being switched.

In accordance with the present invention, there is provided a clock switching circuit comprising a selector, a first stabilizer, a second stabilizer, a first gating cell circuit, a second gating cell circuit and an output circuit. The selector outputs a first control signal when a first clock signal is selected by a selection signal and a first permission signal is not enabled, and outputs a second control signal when the second clock signal is selected by the selection signal and a second permission signal is not enabled, the selection signal selecting either the first clock signal or the second clock signal. The first stabilizer includes a plurality of cascaded flip-flops for holding the first control signal in timed with the first clock signal to output the second permission signal. The second stabilizer includes a plurality of cascaded flip-flops for holding the second control signal in timed with the second clock signal to output the first permission signal. The first gating cell circuit latches and outputs the first clock signal as an output clock signal when the second permission signal is supplied. The second gating cell circuit latches and outputs the second clock signal as an output clock signal when the first permission signal is supplied. The output circuit outputs the output clock signal output from the first gating cell circuit or the second gating cell circuit, whereby the first clock signal output from the first gating cell circuit or the second clock signal output from the second gating cell circuit is output as the output clock signal.

The present invention comprises the selector, the first stabilizer and the second stabilizer. The selector outputs the first control signal when the first clock signal is selected by the selection signal and the first permission signal is not enabled, while outputting the second control signal when the second clock signal is selected and the second permission signal is not enabled. The first stabilizer includes a plural number of cascaded flip-flops and outputs the second permission signal. These flip-flops hold the first control signal in synchronization with the first clock signal. The second stabilizer includes a plural number of cascaded flip-flops and outputs the first permission signal. These flip-flops hold the second control signal in synchronization with the second clock signal. Thus, when the first clock signal is switched to the second clock signal or vice versa by the selection signal, there is caused a period of time when none of the clock signals is permitted to be output. When the permission signal is output, the clock signal permitted to be output is latched by the gating cell circuit. Hence, the clock signals concerned may be switched without causing hazards independently of the frequencies of the clock signals.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

The above-stated and other objects and advantages as well as the novel features of the present invention will become more apparent on reading the following description of the preferred embodiment in conjunction with the accompanying drawings. It should be noted that the drawings are merely for reference and are not intended to restrict the scope of the present invention.

Figure 1:
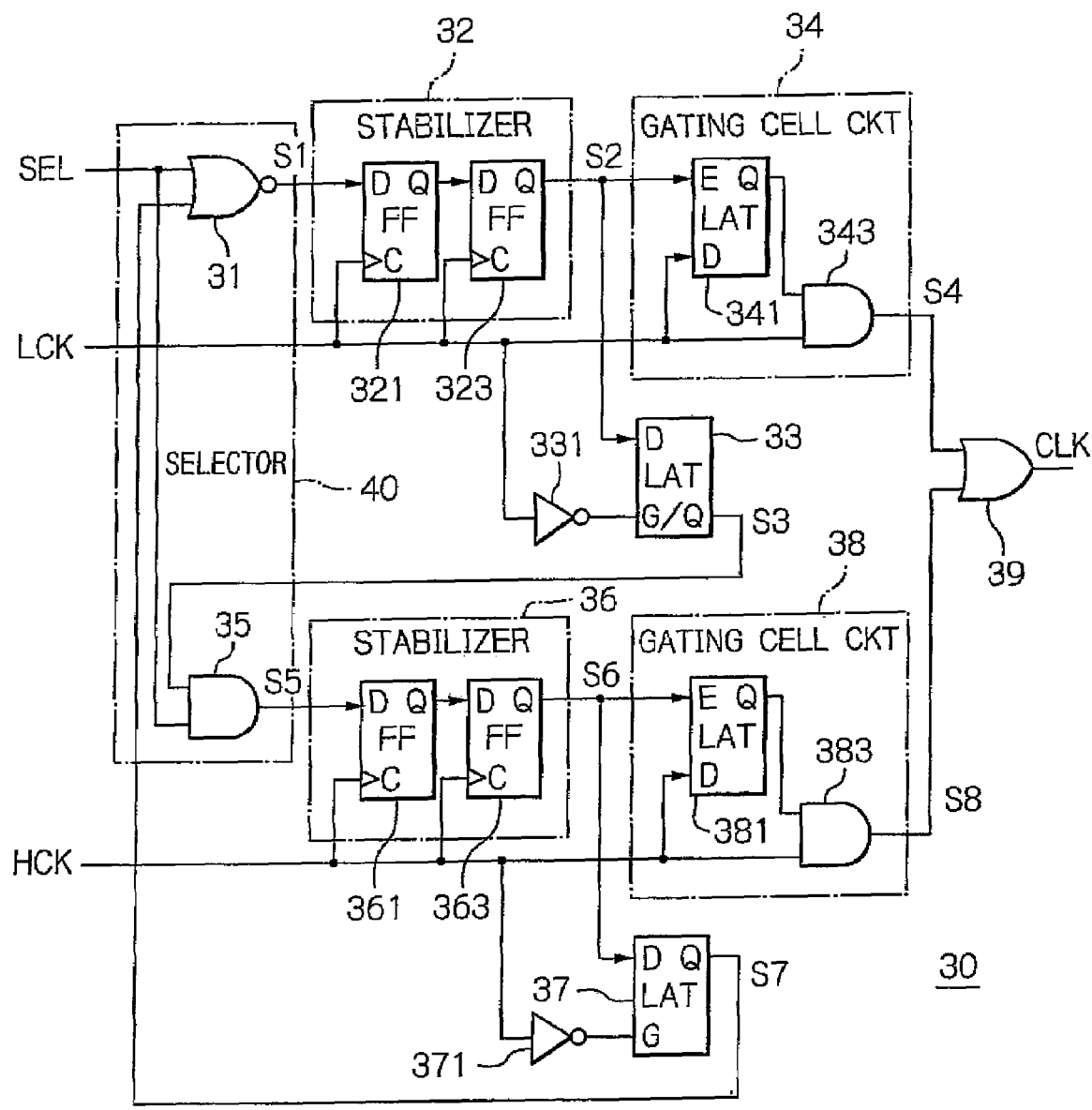
FIG. 1 is a schematic circuit diagram showing a clock switching circuit according to a preferred embodiment of the present invention.

Reference is first made to FIG. 1 showing a preferred embodiment of a clock switching circuit 30 according to the present invention. The clock switching circuit 30 is adapted to switch between a low speed clock LCK and a high speed clock HCK in response to a selection signal SEL to output a resultant clock signal CLK. The high speed clock HCK is of a period shorter than that of the low speed clock LCK. The clock switching circuit 30 includes a NOR gate 31 adapted for receiving the selection signal SEL and a signal S7, and an AND gate 35 adapted for receiving the selection signal SEL and a signal S3, as will be described later.

The signal S1 output from the NOR gate 31 is supplied to a stabilizer 32 which is made up of two or more flip-flops (FFs) 321 and 323 cascaded to each other as illustrated. The flip-flops 321 and 323 function as holding a signal received on the input terminal D thereof in timed with the common, low speed clock LCK to deliver the output signal. More specifically with the present embodiment, the flip-flop 321 has its input port D connected to receive the signal S1 and its output port Q interconnected to the input port D of the other flip-flop 323, which has its output port Q interconnected to the input port E of data latches 33 and 341 described later on. The two flip-flops 321 and 323 have the clock terminals C interconnected to receive the low speed clock LCK, and are operative in response to the positive-going edge the low-speed clock LCK. The stabilizer 32 ultimately outputs a resultant signal S2.

The signal S2 output from the stabilizer 32 is transferred to an input terminal D of a data latch (LAT) 33 and to a gating cell circuit 34. The data latch 33 is adapted to hold a signal received on its input terminal D in timed with the low speed clock LCK, but inverted by an inverter 331, that is, the negative-going edge of the low speed clock LCK, to develop an output signal S3 on its an inverting output terminal /Q.

The gating cell circuit 34 is adapted to latch the low speed clock LCK in response to the signal S2 output from the stabilizer 32 to produce a resultant clock on its output port S4. The gating cell circuit 34 is made up of a data latch 341 and an AND gate 343 interconnected as illustrated, for instance. The data latch 341 has its enable terminal E and data terminal D supplied with the signal S2 and the low speed clock LCK, respectively. The data latch 341 also has its output terminal Q connected to one of input ports of the AND gate 343, which has its other input port supplied with the low speed clock LCK to deliver a resultant signal S4 on its output port.

The AND gate 35, which forms a selector 40 together with the NOR gate 31, has its output S5 transferred to another stabilizer 36 similar in constitution to the stabilizer 32 except for receiving the high speed clock HCK rather than the low speed clock LCK. The other stabilizer 36 is made up of two or more cascaded flip-flops 361 and 363. The flip-flops 361 and 363 are cascaded in the similar fashion to the flip-flops 321 and 323 described earlier, and adapted to hold a signal received on the input terminal D thereof in timed with the common, high-speed clock to develop an output signal.

The stabilizer 36 is adapted for transferring an output signal S6 to an input terminal D of another data latch 37 and another gating cell circuit 38. The data latch 37 is adapted to hold a signal supplied to its input terminal D in timed with the high speed clock HCK, after inversion by an inverter 371, to produce an output signal S7 on its non-inverting output terminal Q.

The other gating cell circuit 38 serves as latching the high speed clock HCK in response to the output signal S6 from the stabilizer 36 to develop the latched signal as a signal S8. The gating cell circuit 38 may be similar in constitution to the gating cell circuit 34.

The clock switching circuit 30 includes an OR gate 39, which is adapted to take the logical OR between the signals S4 and S8 output from the gating cells 34 and 38, respectively, to output a resulting signal in the form of the clock signal CLK thus selected.

Figure 2:
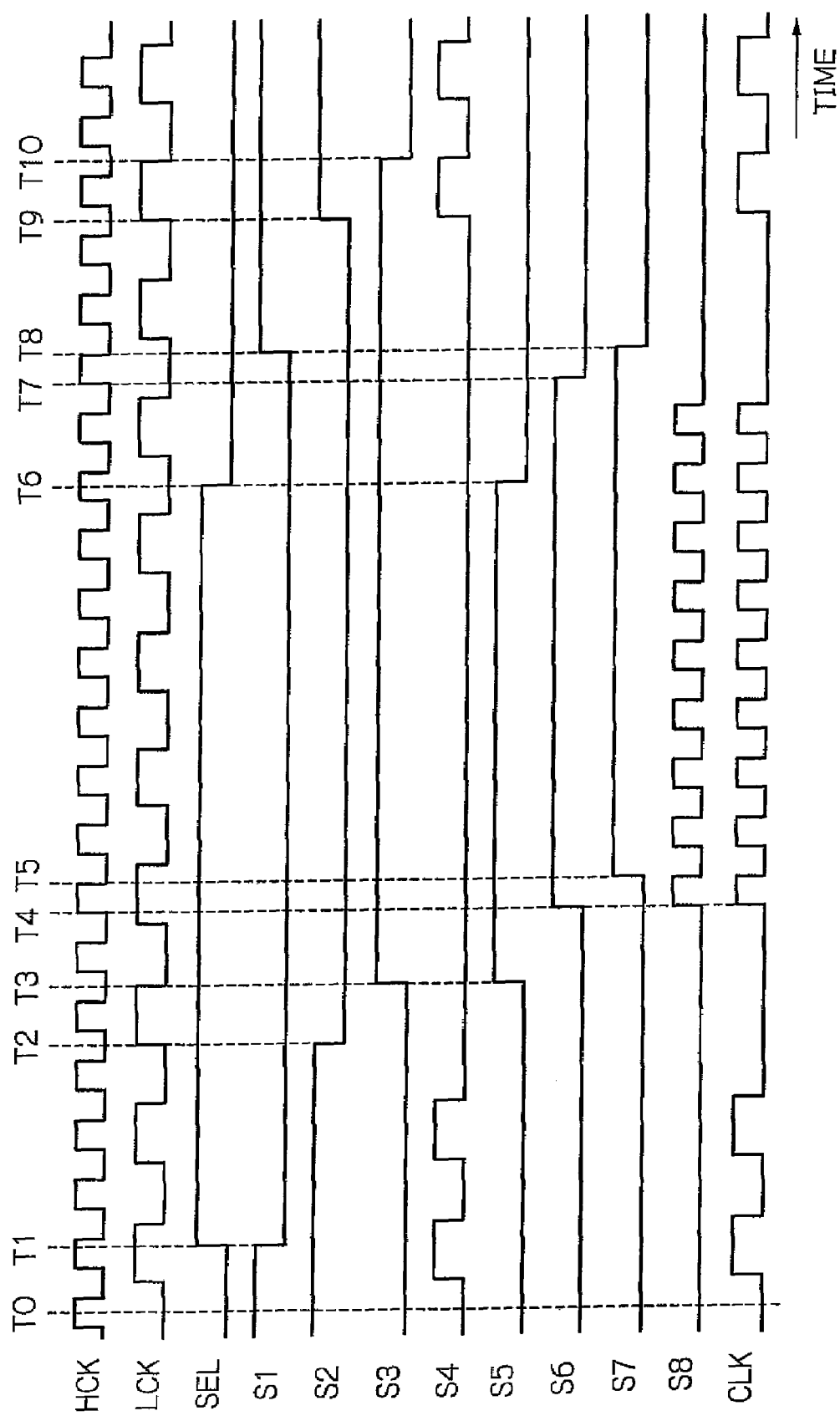
FIG. 2 shows signal waveforms appearing in the portions of the embodiment shown in FIG. 1.

Referring now to FIG. 2, which depicts signal waveforms appearing in the portions of the illustrative embodiment shown in FIG. 1, the operation of the clock switching circuit 30 will now be described in detail.

In operation, at a time T0, FIG. 2, a predetermined time has elapsed from the time the selection signal SEL took its "L" (low) level, thus rendering the operation stable, and the signal S5 output from the AND gate 35 being its "L" level. The signal S6 output from the stabilizer 36, the signal S7 output from the data latch 37 and the signal S8 output from the gating cell circuit 38 are all in "L" level thereof.

The signal S1 output from the NOR gate 31 and the signal S2 output from the stabilizer 32 are of the "H" (high) level thereof. The signal S3 output from the data latch 33 is low "L" in level. Since the signal S2 is high "H", the low speed clock LCK is output as signal S4 from the gating cell S4. This causes the low speed clock LCK to be output from the OR gate 39 as the clock signal LCK.

When the selection signal SEL is changed at a time T1 from "L" to "H", the signal S1 is immediately changed to "L". Since the signal S2 is not as yet changed at this time point, the low speed clock LCK keeps on to be output at the gating cell circuit 34. Since the signal S3 is "L", the signal S5 is "L", and hence the high speed clock HCK from the gating cell circuit 38 is in its halting state.

After the selection signal SEL is changed at a time T1 to "H", the signal S2 is changed to "L" at a timing T2, which corresponds to the positive-going edge of the second clock pulse of the low speed clock LCK. This halts outputting of the low speed clock LCK from the gating cell circuit 34. The clock signal CLK output from the OR gate 39 is fixed at "L".

When the low speed clock LCK goes negative at a time T3, the signal S3 becomes "H", and accordingly, the signal S5 becomes "H".

After the signal S5 is changed at a time T3 to "H", the signal S6 is changed to "H" at a timing T4, which corresponds to the positive-going edge of the second clock pulse of the high speed clock HCK. This causes the gating cell circuit 38 to output the high speed clock HCK as the signal S8, so that this high speed clock HCK commences to be output as the clock signal CLK from the OR gate 39.

When the high speed clock HCK goes negative at a time T5, the signal S7 becomes "H" in level. At this time point, the signal S1 is kept at "L" because the selection signal SEL is "H". Thus, the high speed clock HCK keeps on to be output from the OR gate 39 as the clock signal CLK.

When the selection signal SEL is changed at a time T6 from "H" to "L", the signal S5 is immediately changed to "L". Since the signal S6 is not as yet changed at this time point, the high speed clock HCK keeps on to be output from the gating cell circuit 38. Since the signal S7 is "H", the signal S1 is "L", and hence the low speed clock LCK from the gating cell circuit 34 keeps on to halt.

After the selection signal SEL is changed to "L" at a time T6, the signal S6 is changed to "L" at a time T7 which corresponds to the positive-going edge of the second clock pulse of the high speed clock HCK. This halts outputting of the high speed clock HCK from the gating cell circuit 38. The clock signal CLK output from the OR gate 39 is fixed to its "L" level.

When the high speed clock HCK goes negative at a time T8, the signal S7 becomes "L", and accordingly, the signal S1 becomes "H".

After the signal S1 is changed at a time T8 to "H", the signal S2 is changed to "H" at a timing T9, which corresponds to the positive-going edge of the second clock pulse of the low speed clock LCK. This causes the gating cell circuit 34 to output the low speed clock LCK as signal S4, so that this low speed clock LCK commences to be output as the clock signal CLK from the OR gate 39.

When the low speed clock LCK falls at a time T10, the signal S3 becomes "L" in level. At this time point, the signal S5 is kept at "L", because the selection signal SEL is "L". Thus, the low speed clock LCK keeps on to be output from the OR gate 39 as the clock signal CLK.

As described above, the clock switching circuit 30 of the present embodiment includes the selector 40 which serves to output the "H" level for the signal S1 as the first control signal when the selection signal SEL is set to "L" to select the low speed clock LCK as the first clock signal and the signal S6 as the first permission signal is halted and is at "L" whereas to output the "H" level for the signal S5 as the second control signal when the selection signal SEL is set to "H" to select the high speed clock HCK as the second clock signal and the signal S2 as the second permission signal S2 is halted and set to "L".

Further, the clock switching circuit 30 includes the first stabilizer 32 made up of the cascaded, plural flip-flops for holding the signal S1 in synchronization with the low speed clock LCK to output the signal S2, the second stabilizer 36 made up of also the cascaded, plural flip-flops for holding the signal S5 in synchronization with the high speed clock HCK to output the signal S6, the first gating cell circuit 34 for latching and outputting the low speed clock LCK when the circuit 34 is supplied with the signal S2, and the second gating cell circuit 38 for latching and outputting the high speed clock HCK when the circuit is supplied with the signal S6. Hence, the instant clock switching circuit 30 presents an advantage that clocks may be switched without causing hazards regardless of the frequencies of the clock signals LCK and HCK being switched.

Figure 4:
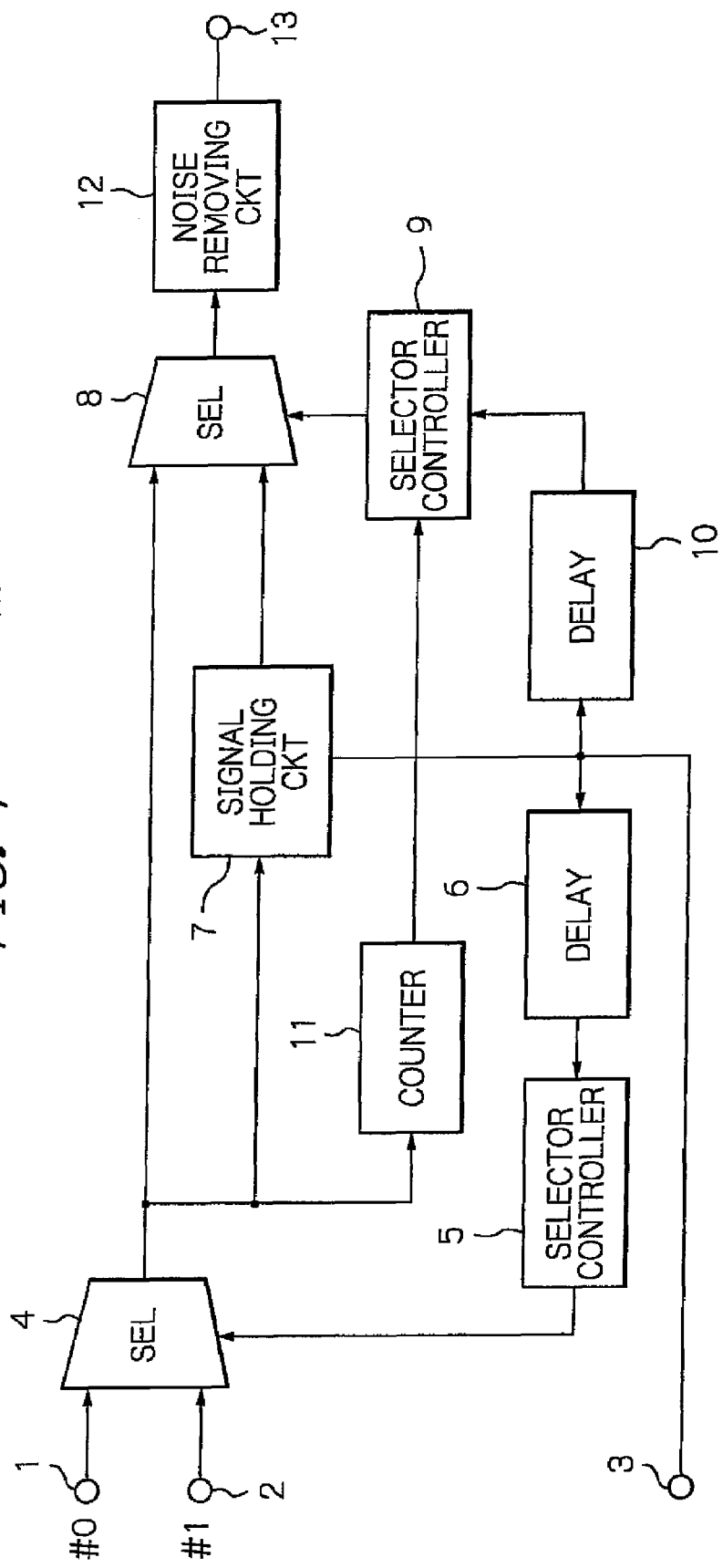
FIG. 4 is a schematic circuit diagram showing a conventional clock controller.

As described earlier, FIG. 4 shows an example of a conventional circuit of a clock controller taught by aforementioned Japanese patent laid-open publication No. 242529/1999. In this conventional circuit, when the selector switching signal is delayed by first and second delay circuits 6 and 10 to switch between the two clocks #0 and #1, it is necessary to set the amount of the delay with the frequency relationships of the clocks #0 and #1 taken into account. This leads to the problem that complicated work is needed on defining the amount of the delay and adaptively changing the amount of the delay in dependent upon changes in frequency of the clocks #0 and #1.

By contrast, the instant illustrative embodiment comprises the selector 40 for outputting the first control signal when the first clock signal is selected by the selection signal and the first permission signal is not output, i.e. enabled, while outputting the second control signal when the second clock signal is selected and the second permission signal is not output, i.e. enabled, the first stabilizer 32 including the cascaded, plural flip-flops to output the second permission signal, the flip-flops holding the first control signal in timed with the first clock signal, and the second stabilizer 36 including also the cascaded, plural flip-flops to output the first permission signal, the flip-flops holding the second control signal in timed with the second clock signal. Thus, when the first clock signal is switched to the second clock signal or vice versa in response to the selection signal, there is provided a period when none of the clock signals is permitted to be output. When the permission signal is output, the clock signal permitted to be output is latched by the gating cell circuit 34 or 38. Hence, the clock signals concerned may be switched without causing hazards independently of the frequencies of the clock signals.

Figure 3:
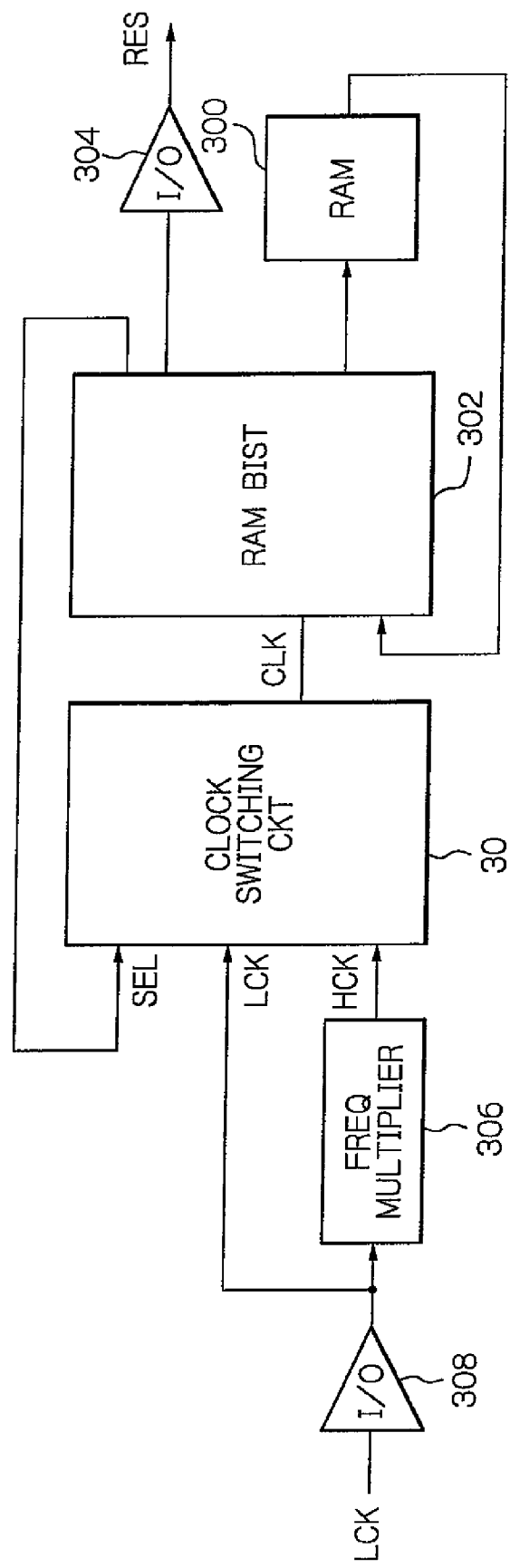
FIG. 3 is a schematic circuit diagram for illustrating an example to which the clock switching circuit shown in FIG. 1 is applied.

FIG. 3 shows in a schematic diagram an application of the clock switching circuit 30 shown in FIG. 1. In the exemplified application illustrated, the clock switching circuit 30 is applied to a built-in test circuit (BIST) 302. The system shown in FIG. 3 also includes a random access memory (RAM) 300, and a RAM built-in self test circuit (RAM BIST) 302 interconnected to the clock switching circuit 30.

The RAM BIST circuit 302 is a test circuit for testing a memory device, such as the RAM 300, and is run at a RAM operational frequency. The RAM BIST circuit 302 outputs test result signals RES including a test end signal, a failure diagnosis signal or a repair signal, etc. It is noted that the response speed of an input/output (I/O) buffer 304 is limited. For example, with the operational frequency of the RAM 300 of 200 MHz, the operational frequency of the I/O buffer 304 is approximately equal to 100 MHz. Hence, the test result signals RES would not be output by the same high speed operation as that of the RAM 300.

However, the RAM BIST circuit 302 is connected such that the RAM BIST circuit 302, when outputting the test result signals RES, outputs the selection signal SEL for clock switching to the clock switching circuit 30, and the clock switching circuit 30 is responsive to the selection signal SEL to switch the clock signal CLK, supplied to the RAM BIST circuit 302, to the low speed clock LCK, the RAM BIST circuit 302 in turn outputting the test result signals RES. When the result signals RES are output and the high speed operation is to be performed, the selection signal SEL is switched, whereby the clock CLK supplied to the RAM BIST circuit 302 may be set to the high speed clock HCK.

The exemplified system further includes a frequency multiplier 306 which is adapted to receive the low speed clock LCK through another I/O buffer 308 to frequency-multiply the received clock LCK into the high speed clock HCK, which is in turn fed to the clock switching circuit 304.

The present invention is not limited to the above-described specific embodiment but may comprise various modifications. For instance, the configuration of the gate circuits of the selector 40 shown is merely illustrative and may be replaced by other logic circuits having comparable functions. For example, the NOR gate 31 may be replaced by an AND gate which has its one input supplied with the inverted form of the selection signal SEL and the other input with a signal from an inverting output terminal, not shown, of the data latch 37. The gate cell circuits 34 and 38 may also be replaced by logic circuits having the comparable functions.

The entire disclosure of Japanese patent application No. 2006-234300 filed on Aug. 30, 2006, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A clock switching circuit comprising:
    a selector which outputs a first control signal when a first clock signal is selected by a selection signal and a first permission signal is not enabled, and which outputs a second control signal when the second clock signal is selected by the selection signal and a second permission signal is not enabled, the selection signal selecting either of the first clock signal and the second clock signal;
    a first stabilizer which receives and holds the first control signal timed with the first clock signal, and which outputs the second permission signal;
    a second stabilizer which receives and holds the second control signal timed with the second clock signal, and which outputs the first permission signal;
    a first gating cell circuit which is operative in response to the second permission signal to latch and output the first clock signal as a first output clock signal;
    a second gating cell circuit which is operative in response to the first permission signal to latch and output the second clock signal as a second output clock signal;
    an output circuit which outputs the first output clock signal output from said first gating cell circuit or the second output clock signal from said second gating cell circuit as the output clock signal;
    a first latch which is operative in response to the first permission signal to prevent said selector from outputting the first control signal; and
    a second latch which is operative in response to the second permission signal to prevent said selector from outputting the second control signal.

2. The switching circuit in accordance with claim 1, wherein said first stabilizer comprises a plurality of flip-flops cascaded to each other,
    said second stabilizer comprising a plurality of flip-flops cascaded to each other.

3. The switching circuit in accordance with claim 1, wherein the first clock signal is higher in frequency than the second clock signal.

4. A clock switching circuit comprising:
    a selector which outputs a first control signal when a first clock signal is selected by a selection signal and a first permission signal is not enabled, and which outputs a second control signal when the second clock signal is selected by the selection signal and a second permission signal is not enabled, the selection signal selecting either of the first clock signal and the second clock signal;
    a first stabilizer connected to said selector to output the second permission signal responsive to the first control signal as timed with the first clock signal;
    a second stabilizer connected to said selector to output the first permission signal responsive to the second control signal as timed with the second clock signal;
    a first gating cell circuit connected to said first stabilizer to output the first clock signal in response to the second permission signal;
    a second gating cell circuit connected to said second stabilizer to output the second clock signal in response to the first permission signal;
    an output circuit connected to said first and second gating cell circuits to output the first clock signal or the second clock signal as an output clock signal from said clock switching circuit:
    a first latch, connected between said first stabilizer and said selector, and responsive to the second permission signal to prevent said selector from outputting the second control signal; and
    a second latch, connected between said second stabilizer and said selector, and responsive to the first permission signal to prevent said selector from outputting the first control signal.

5. The switching circuit in accordance with claim 4, wherein said first stabilizer comprises a plurality of flip-flops cascaded to each other,
    said second stabilizer comprising a plurality of flip-flops cascaded to each other.

6. The switching circuit in accordance with claim 4, wherein the first clock signal is higher in frequency than the second clock signal.

* * * * *